July 18, 1961 J. G. DEMARTRES 2,993,085

SYSTEM FOR AUTOMATICALLY CHARGING TELEGRAPH COMMUNICATIONS

Filed Sept. 11, 1956

INVENTOR

JEAN GEORGES DEMARTRES

BY Paul M. Craig, Jr.

ATTORNEY.

2,993,085

SYSTEM FOR AUTOMATICALLY CHARGING TELEGRAPH COMMUNICATIONS

Jean G. Demartres, Paris, France, assignor to Compagnie Industrielle des Telephones, Paris, France, a corporation of France Filed Sept. 11, 1956, Ser. No. 609,153
Claims priority, application France Sept. 16, 1955
3 Claims. (Cl. 178—2)

The present invention is concerned with the automatic charging of the telegraph communications which meet the following two conditions:

(1) They are directly sent by subscribers each of which possesses an individual sending station.

(2) Each character is sent in the international telegraph code of five moments preceded by a "start" and followed by a "stop." Each moment lasts about 20 milliseconds. According to the character to be sent positive or negative current is sent over the line during the different moments. During the start, which also lasts about 20 milliseconds, negative current is sent over the line. During the stop, which lasts about 30 milliseconds, the current sent is positive.

The sending station may belong to a public or a private subscriber. In the first case the communication should never be charged. In the second case it should only be charged if the called station is also a private one, if it has actually been reached and if it has informed the calling station that it has. The present invention is concerned with automatic means which are designed in this second case to charge, without any error being possible, only those communications which should be.

Any telegraph message begins with a so-called code. It consists of a succession of 20 characters, which allows of identifying the calling and called stations. When the called station has been reached and sends its code for checking at the calling station, it is the first one of the 20 characters of this code which enables to discriminate between the charged and the uncharged communications.

Figure 1:
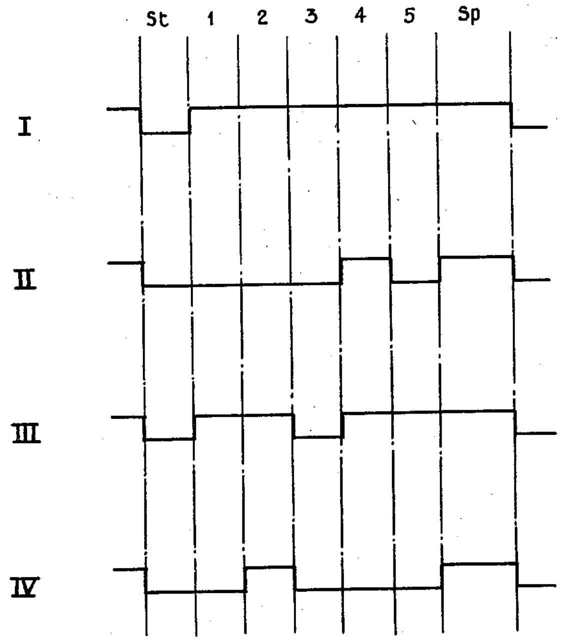

FIG. 1 comprises four diagrams, designated by Roman numerals I to IV. In each of these diagrams the upper horizontal line corresponds to the sending of current having a positive polarity over the line and the lower horizontal line to the sending of current of negative polarity. *St* designates the start, *Sp* the stop and numerals 1 to 5 the five above mentioned moments respectively. Diagram I corresponds to the case where the communication is to be charged and Diagrams II, III and IV to three other possible cases in none of which the communication should be charged. These three cases are called in the art "carriage return," "figure shift" and "line feed" respectively.

Different systems have already been proposed to avoid unduly charging communications which should not be charged and conversely, but all of them are liable to errors caused by the accidental sending of one or more impulses over the telegraph line.

The present invention has for its object for an especially simple and efficient system in which no such errors can take place. This system is located in that part of the installation which is called "charging marker" and it controls the operation of this marker. As will be explained hereinafter in greater detail, the system according to the invention comprises a number of individual devices, which are hereinafter termed a discriminating device, a supervising device, a holding device, a delayed-action device and a connection, which perform the following functions respectively:

The discriminating device distinguishes Diagram I, which is that of the first character of the code of a charged communication, from Diagrams II, III and IV, one of which is that of the first character of the code of an uncharged communication.

The supervising device avoids that a negative-current impulse casually sent over the line be erroneously considered as the start of the first character of a charged communication (Diagram I). More generally, its condition changes when current of the same polarity has remained on the line during a time longer that the longest time which is compatible with the transmission of characters. The predetermined period at the end of which the condition of the discriminating device changes is longer than the five moments plus the stop (130 ms. in all) but is preferably chosen shorter than the whole sending time (150 ms.) of a complete character, that is, not only the five moments plus the stop (130 ms.) but also plus the start (20 ms.).

The holding device maintains the condition of the discriminating device so long as the sending of the alternating pulses which characterise any character of a code is taking place.

The delayed-action device allows of registering at a suitable time the condition of the discriminating device. A moment as close as possible to the end of the time (3 sec.) of the complete code is preferably chosen for the operation of this delayed-action device.

The connection allows of communicating to the charging meter the condition of the discriminating device at the time when the delayed-action device is operating.

It may also be controlled not only by the discriminating device, but also by the supervising device. In that case it allows of registering as well the communications which should not be charged as those which should be and to distinguish between them.

Figure 2:
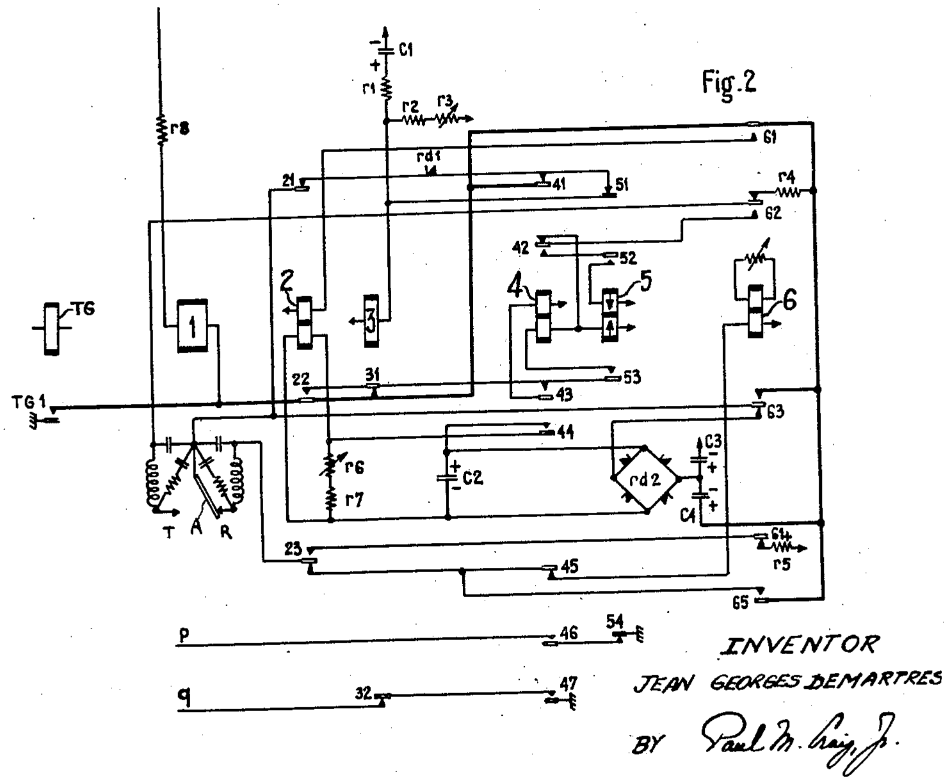

An embodiment of the system according to the invention will now be described with reference to FIG. 2 and also to the diagrams of FIG. 1. In FIG. 2, the reference characters 1 to 6 designate relays. Except for relay 1 their contacts are designated by two-digit numerals, the left digit being that which designates the corresponding relay. For the sake of simplicity the ground and the terminal battery, which has been represented by an arrow, of the circuits traced hereinafter are not mentioned. The references beginning with letter *r* designate resistances and those beginning with letter *c* condensers.

Relay 1 is a telegraph relay. A conductor connected with the called remote station runs therethrough. A is the armature of this relay. It is in contact either with contact R or with contact T of relay 1 according as positive or negative current is sent over the line. A, R and T constitute together a switching device. When the armature A is in contact with the contact R, the switching device is in its normal position. When the armature A is in contact with the contact T it is in its non-normal position.

When a call is initiated, relay TG is energized by means which do not matter here and contact TG1 is closed.

A general ground is given by contact TG1. The conductors which are permanently connected with this ground have been represented by thick lines.

The system according to the invention essentially comprises a discriminating device, a supervising device, and a delayed-action device, the main elements of which are relays 5, 2 and 3 respectively and the operations of which are described hereinafter.

*Discriminating device*

Let us first consider the case of Diagram II of FIG. 1. Before the appearance of the first character positive current is on the called subscriber's line and relay 6 is therefore energized over 45, 23, R, 21, rectifier *rd*1 and 41.

6 is held over 45, 65.

3 is energized over 51 and 41. It will remain energized during the time hereinafter stated under the heading "Delayed-Action Device."

2 is energized over its upper winding and 61. It will remain energized during the time hereinafter stated under the heading "Supervising Device."

The system is at that time in its waiting position.

When the start arrives, 5 energizes over its lower winding, 42, 62, T and 63 in its front position.

4 is short-circuited by the grounded conductor (in thick line) 22, 53, its lower winding, 42, 62, T and 63 in its front position.

This situation will continue during moments 1, 2 and 3.

At the appearance of a positive polarity, at the beginning of the fourth moment, relay 4 will no longer be short-circuited by the above mentioned circuit passing over contact T and will energize over: lower winding of 5, lower winding of 4, 53 and 22.

The holding circuit of relay 6 is opened at 45, but relay 6 has a release delay of three moments, that is, 60 milliseconds, and will therefore fall back only during the stop.

At the beginning of the fifth moment the negative polarity appears on the line and the circuit of the upper winding of relay 5 is closed over: 52, 42, 62, T and 63 in its front position. Relay 5, which is a differential relay, falls back.

Positive current again appears on the line at the beginning of the stop, but nothing will be changed in the condition of the three relays 6, 4 and 5: relay 6 remains energized on account of its 60 milliseconds delay, 4 remains energized over its upper winding, 43 and 22, and 5 remains unenergized since the circuits of its two windings are opened, one at 42, the other at 52.

6 will fall back during the stop but 4 will remain energized over 43 and 22 and 5 will remain unenergized for the reasons just stated. At the end of the first character the relays are therefore found in the following conditions: 6 unenergized, 5 unenergized and 4 energized. This condition will continue so long relay 2 will remain energized and therefore contact 22 closed, that is, during the reception of the characters which will follow.

The circumstances respecting Diagrams III and IV are similar with those respecting Diagram II. In both diagrams, 5 energizes at the beginning of the start. In Diagram III, 4 energizes at the beginning of the first moment, 5 falls back at the beginning of the third moment and 6 falls back at the beginning of the fourth moment. In Diagram IV, 4 energizes at the beginning of the second moment, 5 falls back at the beginning of the third moment and 6 falls back at the beginning of the fifth moment.

Let us now consider Diagram I. Relay 5 energizes, here also, at the beginning of the start. 4 energizes at the beginning of the first moment. 6 falls back at the beginning of the fourth moment, opening its contact 62. Therefore, when a negative polarity will again appear with the start of the following character, the upper winding of differential relay 5 will find its circuit opened at 62 and this relay will remain energized. The condition of relay 5 at the end of the first character therefore allows of distinguishing between the case of uncharged communications, which is that of the three Diagrams II, III and IV, and the case of charged communications, which is that of Diagram I: relay 5 is unenergized in the first case and energized in the second.

*Supervising device*

We have seen, under the heading "Discriminating Device" that 2 has energized before the reception of the first character and that 6 has fallen back during the reception of this character and will remain unenergized during the reception of the following characters. Relay 2, which had energized over 61 in front position, would also fall back if it had no release delay. But it has a certain release delay. On the other hand, from the moment when relay 6 has fallen back, either one or the other of the following two circuits is closed over relay 2:

(*a*) When positive current is sent over the line at any time during the sending of the code: *r*5, 64, 23, R, 63 in back condition, rectifier *rd*2, lower winding of relay 2, 44, rectifier *rd*2, C4.

(*b*) When negative current is sent over the line: C3, rectifier *rd*2, lower winding of relay 2, 44, rectifier *rd*2, 63, T, 62 in back position, *r*4.

The successive sendings of positive and negative moments provide, over these two circuits, for an alternating charging and discharging of condensers C3 and C4 through relay 2. The holding of this relay will be so controlled by resistances *r*6 and *r*7 that it will remain operated for the limit case of Diagram I, in which the same polarity remains during the five moments plus the stop, but on the contrary does not remain operated for a longer time, especially for the time of an entire cycle, comprising not only the five moments plus the stop, but also the start, because such a time exceeds the sending time of any character, whatever it may be. For example, with certain apparatus, the entire cycle of which lasts 180 milliseconds, including a 20 millisecond start, the release delay of relay 2 will be chosen longer than 160 and preferably shorter than 180 milliseconds. This delay is provided by condenser C2.

*Holding device*

As has already been stated above under the heading "Discriminating Device" relay 5 is energized at a time later than the beginning of the start by the duration (150 ms.) of the reception of a character when the received impulses conform to Digram I. If these impulses are actually those of the first character of a code, relay 2 will remain energized during the whole time of the reception of the code, as has been just explained, and relay 5 will remain held energized during the same time over the holding device constituted by contact 22.

If on the contrary the impulses corresponding to Diagram I are not those of the first character of a code and for instance correspond to an accidental negative impulse, relay 2 will fall back, relay 5 will also fall back, and its release will restore the whole system to its idle condition, where it will be again available for the reception of a true code.

*Delayed action device*

When the charging marker is seized, relay 3 is energized over TG1, 41 and 51.

Condenser C1 is also charged over TG1, 41 and 51.

It has been seen above that relay 5 energizes when a negative polarity appears on the line.

It opens at 51 the supply circuit of relay 3 and the charging circuit of condenser C1. The latter discharges through resistance *r*1 and relay 3, which will therefore remain energized for a certain time after the appearance of the negative polarity. This time is preferably chosen as little inferior as possible to the sending time of the code. The normal modulation time of a character is 150 milliseconds. The whole sending time of the 20 characters of which a code is made up therefore amounts to $150 \times 20 = 3000$ milliseconds. Certain teleprinters however still operate with a 140 millisecond cycle. The sending time of the code is for them $140 \times 20 = 2800$ milliseconds only. A suitable release delay of relay 3 will be for instance 2600 milliseconds.

Resistances *r*2 and *r*3 allow of adjusting the release delay of relay 3.

If relay 2 falls back during the time which has just been mentioned because a same polarity has remained over the line during a time longer than the sending time (130 ms.) of the five moments plus the stop, the holding circuit of relays 4 and 5 is opened at 22, these two relays fall back and the system is restored to its idle position.

If on the contrary at the end of the time which has just been stated, that is, when relay 3 falls back, relay 2 has not fallen back, relay 4 is operated, contact 47 is closed, and a ground is connected to wire *q* over this contact and contact 32. Charging will then take place if a ground is not at the same time connected to wire *p*, as has already been mentioned above.

*Connection*

The connection consists of wires *p* and *q*. If, when relay 3 falls back and consequently contact 32 is closed, relay 2 is still operated because, as has been explained in the part of the description which is entitled "Supervising Device," the pulses sent till then have actually been those of a code, relay 4 is operated over contacts 43 and 22, contacts 46 and 47 are closed, wire *q* is earthed over contacts 32 and 47 and the charging system is informed of the charging.

In the case where the first character of the code was that of Diagram I, which corresponds to a charged communication, relay 5 was operated at the end of the sending time of the first character of the code, as explained hereinbefore at the close of the section entitled "Discriminating Device," and it has remained operated until relay 3 has fallen back, as hereinbefore explained in the section entitled "Holding Device." Contact 54 is then open, and wire *p* is not earthed.

If on the contrary the first character was one shown by the Diagrams II, III and IV, relay 5 is idle and wire *p* is not earthed.

Wire *p* thus allows to distinguish between the communications which should be and those which should not be charged.

I claim:

1. In a charge recording system of a telegraphic communication center, a device for controlling the charging of telegraphic communications sent by a called subscriber to a calling subscriber using the telegraphic characters which are sent back by the called subscriber as an indicative signal, said characters consisting of a negative start, five moments, and a positive stop according to the 5-moment telegraphic code, to differentiate the communications having to be charged from the ones which should not be charged, comprising means to determine, by examination of the indicative signal received from the called subscriber, if the charge is applicable, said means including three different means for verifying three different characteristics with which the indicative signal must comply to warrant a charge, each characteristic being checked by one of said different means and the three means being operated simultaneously, the first of said different means including means responsive to the moments of the first character of the indicative signal and operable to different conditions to verify that the subscriber is either public or private, the second of said different means including means for verifying the total duration of passage of the indicative signal and operable to a predetermined condition to discriminate the indicative signal from an accidental false signal, and the third of said different means including means for checking the regularity of the rhythm signal and operable to a predetermined condition to verify that the signals are emitted by a teleprinter, and means responsive to one predetermined condition of each one of the three different verifying means indicative of an affirmative verifying response to provide a signal indicating authorization of the charging of the communication.

2. A device according to claim 1 in which the first of said different verifying means utilized for the control of the nature of the first character is constituted by two relays, the first relay including means for energizing it when a first negative start is received, the second relay including means for energizing it when a positive moment is received, the first relay including means for releasing it if at least one second negative moment is received in the first character; the second of said different verifying means utilized for verifying the total duration of passage of the received indicative signal including a third relay, means for providing prolonged delay of the release of said third relay including a first condenser connected in series with the third relay, means for charging said condenser and means for adjusting the discharge current of said condenser through the third relay to correspond to the minimum time of passage of the indicative signal; the third of said different verifying means utilized for verifying the regularity of the rhythm including a fourth relay including two windings, means for energizing said windings and providing a time delay in operation of said fourth relay including a pair of condensers, means for energizing said condensers in accordance with the polarity of moments of the character being examined and means for connecting one of said windings to, and for traversal by the charge and discharge currents of, said condensers depending upon whether positive or negative moments are received, so that the total duration of the delay of said third relay corresponds to the time for modulating one character.

3. A device according to claim 2 further comprising a fifth relay for reception of the indicative signal coming from the called subscriber, and a sixth relay known as "preparation relay" which includes means for energizing it before the reception of the start and de-energizing it with a release delay of three moments when the second relay is energized, the first relay and the second relay of the first means each including two windings, the energizing means for said first relay including means for energizing it by way of a first one of its windings upon reception of the negative start and for maintaining this winding energized for the duration of said character, the energizing means for said second relay including means for short-circuiting a first one of its windings upon occurrence of negative pulse during said character and for removing the short circuit when a positive character pulse is received and simultaneously energizing said first and second relays in series by way of their first windings, the third relay including means controlled by the first relay for deenergizing the third relay as soon as the start is received and having its prolonged release delay equal to the duration of the passage of the indicative signal, the condition for having the charge order sent being that the relays are maintained energized by the respective energizing means in response to closing of said first relay, release of said third relay and closing of said fourth relay, said third relay having much greater release delay than the fourth relay.

References Cited in the file of this patent

UNITED STATES PATENTS

| | | |
|---|---|---|
| 1,824,592 | Brooks | Sept. 22, 1931 |
| 2,055,575 | Herman | Sept. 29, 1936 |
| 2,557,943 | Clemens | June 26, 1951 |
| 2,606,961 | Roberts | Aug. 12, 1952 |
| 2,652,446 | Oberman | Sept. 15, 1953 |
| 2,770,670 | Gardner | Nov. 13, 1956 |